United States Patent
Kannan A.S. et al.

(10) Patent No.: US 9,548,921 B2
(45) Date of Patent: Jan. 17, 2017

(54) COMPRESSION OF ROUTING INFORMATION EXCHANGES

(71) Applicant: DELL PRODUCTS L.P., Round Rock, TX (US)

(72) Inventors: Vinod Kannan A.S., Chennai (IN); Purushothaman Ramalingam, Chennai (IN)

(73) Assignee: DELL PRODUCTS, LP, Round Rock, TX (US)

(*) Notice: Subject to any disclaimer, the term of this patent is extended or adjusted under 35 U.S.C. 154(b) by 274 days.

(21) Appl. No.: 14/513,066

(22) Filed: Oct. 13, 2014

(65) Prior Publication Data
US 2016/0105358 A1 Apr. 14, 2016

(51) Int. Cl.
*G06F 15/173* (2006.01)
*H04L 12/771* (2013.01)
*H04L 29/06* (2006.01)

(52) U.S. Cl.
CPC ............... *H04L 45/56* (2013.01); *H04L 69/04* (2013.01)

(58) Field of Classification Search
CPC .................................. H04L 45/56; H04L 69/04
See application file for complete search history.

(56) References Cited

U.S. PATENT DOCUMENTS 6,742,082 B1 * 5/2004 Lango ............... G06F 17/30067
348/E7.071

OTHER PUBLICATIONS

RFC 2328 ("OSPF Version 2", Moy, J., Apr. 1998).*

* cited by examiner

*Primary Examiner* — Michael Y Won
*Assistant Examiner* — Nicholas Celani
(74) *Attorney, Agent, or Firm* — North Weber & Baugh LLP

(57) ABSTRACT

Embodiments of the present invention include systems and methods for improving the exchange of routing information between information handling system by using compression. In embodiments, route information may be packetized as normally performed according to protocol. In embodiments, these packets may be compressed and placed into the data/payload portion of a new format packet. In embodiments, the new format packet includes an extended header with one or more fields that provide information related to the compressed packets in the packet payload. A receiving device receives the new packets with compressed data, decompresses the data, and processes the decompress data packets as per the normal protocol procedures.

20 Claims, 8 Drawing Sheets

COMPRESSION OF ROUTING INFORMATION EXCHANGES

A. TECHNICAL FIELD

The present invention relates to networking and networking devices, more particularly, to systems and methods for improve the exchange of route information between information handling systems.

B. DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Data traffic is communicated using various protocols. Consider the Border Gateway Protocol (BGP). The BGP protocol is a widely-used Internet Protocol and is also used in various data centers. BGP finds the best route for a given destination and programs the best route into hardware memory, such as a Content-Addressable Memory (CAM) table. Typically, BGP performs routing in Transmission-Control Protocol/Internet Protocol (TCP/IP) networks between autonomous systems (inter-domain). As part of the BGP process, a router exchanges routing and reachability information with other BGP systems. Peer routers in internetworking systems use BGP to maintain a consistent view of the internetwork topology. It should be noted that BGP may be used intra-domain between routers within an autonomous system to also maintain a consistent view of the system topology and to determine which router in the system will act as the connection point for other autonomous systems.

Consider, by way of illustration, the internetwork displayed in FIG. 1. FIG. 1 shows an overview diagram of the internetworking 100 of autonomous systems (or domains). As depicted, Router 1 105 is a member of autonomous system 1, which comprises Router 1 105 through Router p 125. Router 1 is communicatively connected to Router 2 130. Router 2 is a member of autonomous system 2, which comprises Router 2 130 through Router m 135. Router 1 105 is also communicatively connected to Router 3 140. Router 3 is a member of autonomous system 3, which comprises Router 3 140 through Router n 145.

Route information 150 is learned in Router 1 105, and using BGP, it will try to install this route in its hardware table and advertise this route to its peers. That is, typically, each router gets routing and reachability information from a neighboring router or routers. For instance, Router 2 130 and Router 3 140 receive routing information from Router 1 105, wherein the reachability information may include a set of route prefixes. After receiving the route information from its peer, Router 2 130 and Router 3 140 each updates its hardware and sends the route update to its peers. In general, each of the routers in FIG. 1 uses a routing protocol that shares the routing and reachability information among immediate neighbors first and then, the reachability information is disseminated throughout the entire network 100.

It should be noted that, for sake of simplicity, FIG. 1 only shows a very small internetworking. Typically, internetworks of routing devices can be and are very large and intricate. Accordingly, the amount of routing information that must be transmitted between routing devices, particularly initially, can be extremely large. Because of the large amount of data that must be transmitted, a large number of data packets must be used to convey the data. This large amount of data packets not only taxes the bandwidth of the system but also can introduce delays as this information is conveyed and processed.

Accordingly, what is need are systems and methods that improve the ability to convey routing information between information handling systems.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
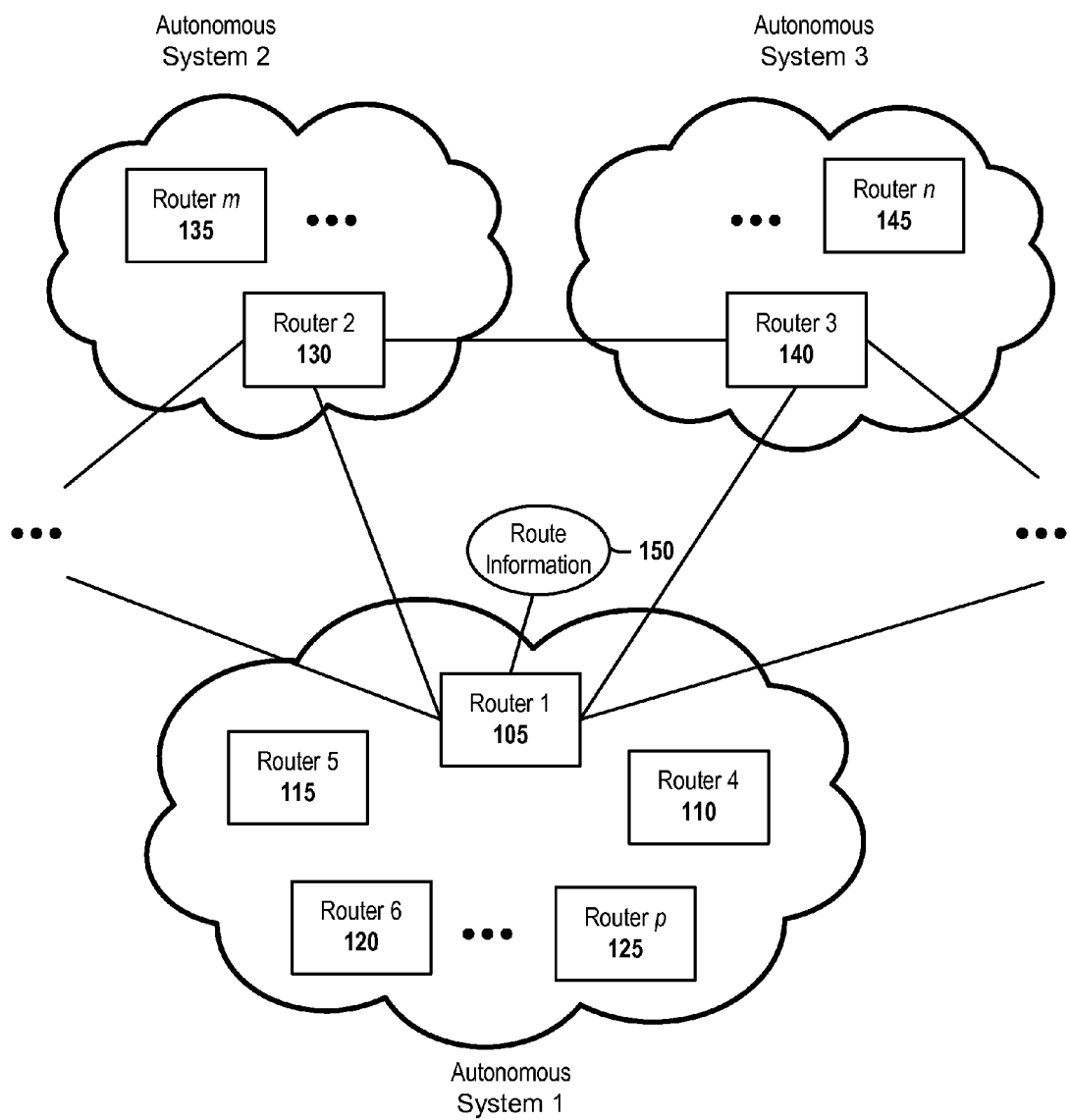
FIG. 1 shows a schematic diagram of an internetwork of information handling systems.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or nodes, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or nodes. Components or nodes may be implemented in software, hardware, or a combination thereof.

Furthermore, connections between components/routers/switches within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Furthermore, one skilled in the art shall recognize: (1) that certain steps may optionally be performed; (2) that steps may not be limited to the specific order set forth herein; and (3) that certain steps may be performed in different orders, including being done contemporaneously.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

The terms "packet," "datagram," or "frame" shall be understood to mean a group of bits that can be transported across a network. These terms shall not be interpreted as limiting embodiments of the present invention to particular layers (e.g., Layer 2 networks, Layer 3 networks, etc.); and, these terms along with similar terms such as "data," "data traffic," "information," "cell," etc. may be replaced by other terminologies referring to a group of bits, and may be used interchangeably.

For purposes of illustration, assume that a router receives route information, such as a set of route destinations or route prefixes (e.g., a.b.c.d/n). The router, or an agent or application operating on the router, may advertise routing information (or control packet information) to neighboring routers using a routing protocol, such as Border Gateway Protocol (BGP). The control packet information may include data indicating that a specific network is reachable, and what the next hop or IP address is to use to get to the final destination.

When a router gains knowledge of the topology of a network, a routing algorithm of the router determines a specific choice of route for data transmission related to that route information. For instance, assuming that each path between two adjacent routers has the same metrics and none of the routers have a failure, the shortest path first (SPF) calculation performed by the routing algorithm of a router (for OSPF/ISIS) and distance vector routing algorithm of a router (for BGP) will show the shortest/optimal path to send data packets. Thus, in embodiments, a BGP agent on the router finds the best route for the given destination and programs or installs this best route into memory in the router.

As noted above, the amount of routing information that must be transmitted between routing devices can be extremely large. BGP peers exchange huge amount of prefix information immediately after BGP session establishment in order to converge. For core internet routers, there could be more than 450,000 route entries sent to a neighbor on session establishment along with attributes.

Aspects of the present invention to speed up the convergence process so that data traffic can flow earlier. By sending routing information, such as BGP routing information, in a compressed format or formats to peer devices, the system can function more efficiently and faster. As a result, initial routing information can be exchanged in a shorter duration, and routers can, in turn, start their best path selection processes and converge quickly. Furthermore, bandwidth usage will also be reduced as compared to the current usage.

A. Embodiments of Route Information Packets

It shall be noted that a BGP update packet will be used herein as an example but that one skilled in the art shall recognize that aspects of the present invention may be applied to other types of packets and to other protocols.

Figure 2:
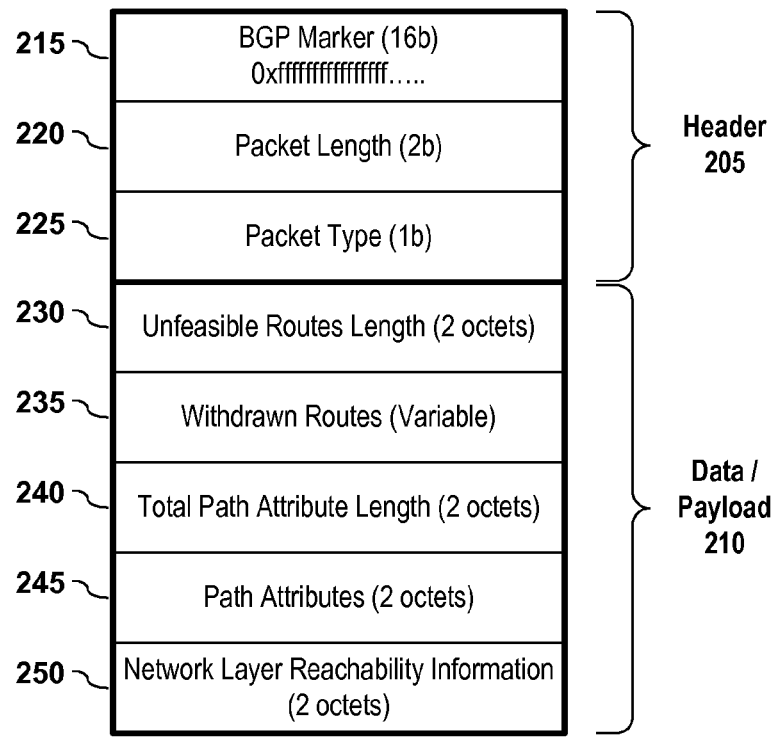
FIG. 2 depicts the data packet structure for a typical BGP update message.

Consider, by way of illustration, a BGP update packet format as displayed graphically in FIG. 2. As shown, the packet comprises a header portion 205 and data or payload portion 210. The header portion 205 comprises a BGP marker 215 of up to 16 bytes. The BGP marker 215 contains an authentication value. The packet length field 220 contains a value that indicates the total number of bytes in the packet. And, the packet type field 225 indicates which BGP message type this packet is. Currently, the BGP packet format has four types of messages: (1) Open; (2) Update; (3) Notification; and (4) Keep-alive. The data portion 210 of an update message type 200, which is illustrated in FIG. 2, may comprise five different fields. These fields include: (1) Unfeasible Routes Length (2 octets); (2) Withdrawn Routes (Variable); (3) Total Path Attribute Length (2 octets); (4) Path Attributes (2 octets); and (5) Network Layer Reachability Information (2 octets).

Figure 3:
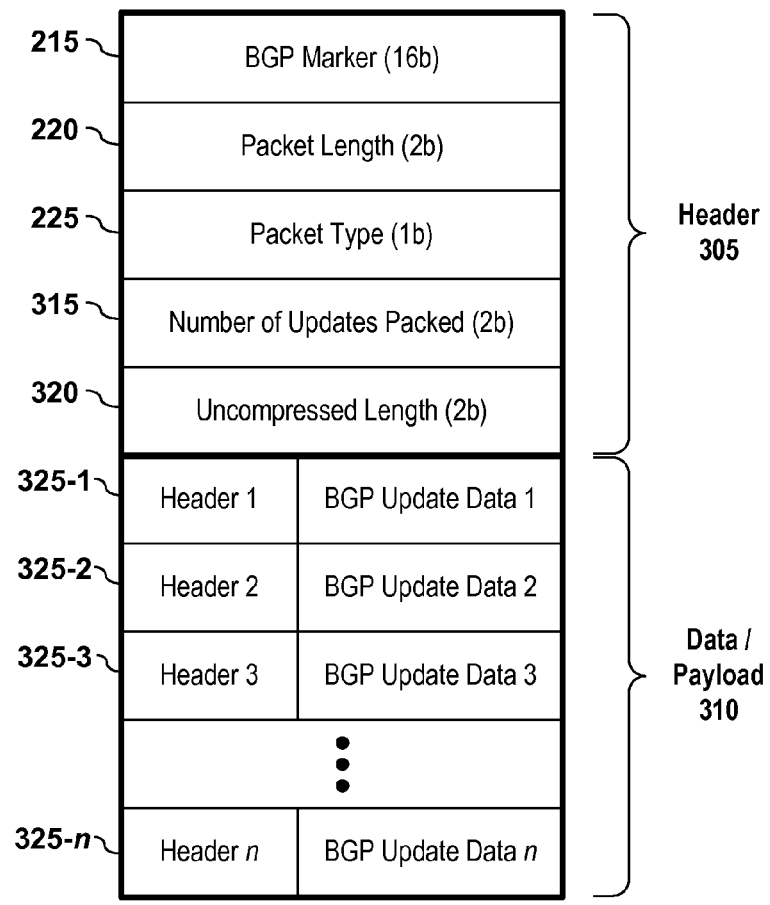
FIG. 3 depicts an example data packet structure for a BGP update message with multiple update packets before compression of the multiple update packets according to embodiments of the present invention.

Aspects of the present invention include defining a new packet type that includes an extended header and different data payload. FIG. 3 depicts an example data packet structure for a BGP update message with multiple update packets before compression according to embodiments of the present invention.

As shown, the packet comprises a header portion 305 and data or payload portion 310. In embodiments, the header portion 305 comprises some of the same or similar fields as a normal BGP update packet. Namely, in embodiments, the header 305 may include a BGP marker 215 field, a packet length 220 field, and a packet type 225 field. In embodiments, to accommodate the new compressed packet type or types, one or more new packet types may be defined. For example, a new type (e.g., Type 5—"COMPRESSED UPDATE") may identify a packet as a compressed BGP update packet—that is, a BGP packet with a data payload of compressed BGP updates.

In embodiments, the header 305 includes one or more additional fields. In the embodiment shown in FIG. 3, the header includes two new header fields. In embodiments, one field is a "Number of Updates Packed" field 315 that indicates the number of legacy BGP data packets (e.g., data packets 325-1 through 325-n) which are included in the payload 310. In embodiments, the size of this field may be 2 bytes. And, in embodiments, another new field is an "Uncompressed Length" field 320 that indicates length or size of the data payload or the entire packet when the data payload is in an uncompressed state. In embodiments, the size of this field may be 2 bytes.

Figure 4:
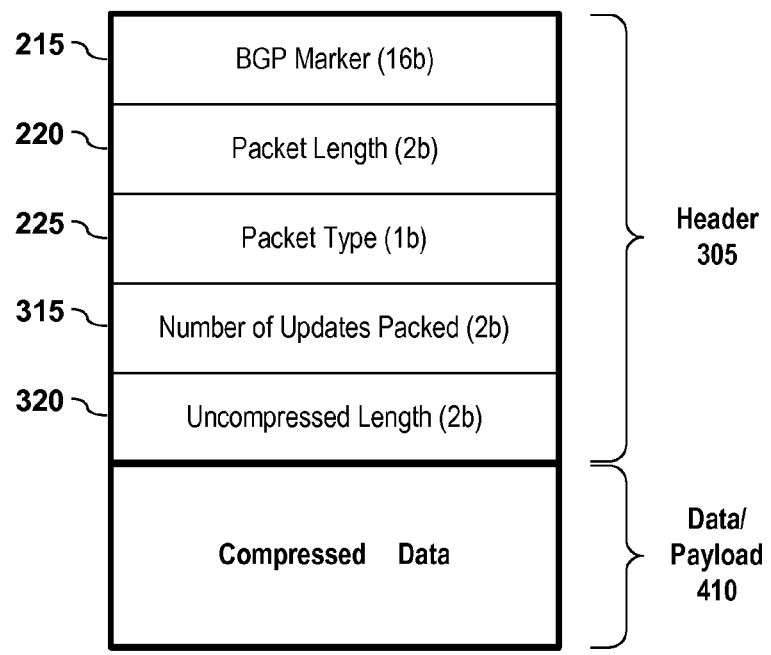
FIG. 4 depicts an example data packet structure for a BGP update message with multiple update packets after compression of the multiple update packets according to embodiments of the present invention.

Turning now to FIG. 4, depicted is an example data packet structure for a BGP update message after compression of the multiple update packets according to embodiments of the present invention. As shown in FIG. 4, in embodiments, the newly extended header portion 305 remains unchanged but the payload section 410 with the legacy BGP update packets along with their headers have been compressed. In embodiments, assuming about 8 times compression rate, the size may be around 4 kilobytes. In embodiments, there is no strict limitation on BGP update packet size, although 4 KB is a generally accepted norm for each update packet.

B. Example Use Cases

Consider, by way of illustration and not limitation, if eight (8) updates needed to be sent—each of which has 4096 bytes of data. In this example, approximately 32,000 bytes of data needs to be transferred. In embodiments, these eight updates are compressed with a lossless compression function. The compression rate may be at the maximum limit.

Assuming that the maximum length of the new compressed update is 4000 bytes and a compression of eight times, all eight updates may be included in a single compressed update packet even if all the updates prior to compression contained 4096 bytes of data to be transmitted. Thus, the number of updates which need to be transmitted is greatly reduced from eight to one.

It shall also be noted that the number of prefixes carried by a single packet is also greatly increased. Typically, when there are two prefixes, each has different path attributes (e.g., a.b.c.d/e and q.r.s.t/v). To send these two prefixes to another routing device under the current BGP process, two BGP packets must be used because these prefixes have different path attributes. In contrast, embodiments of the present invention allow more routes to be sent within the same packet. Thus, even though BGP updates have prefixes with different path attributes, they can be bundled in one compressed update message. Hence, the number of prefixes transmitted per BGP update packet increases and thereby the number of BGP update packets on the wire decreases. As the number of BGP update packet is reduced, bandwidth utilization is reduced and there is also a significant improvement in convergence time.

It should also be noted that in the sample use case above, the eight legacy BGP update were at the maximum size of 4096 bytes. This condition is not always the case. A legacy BGP update packet can be of a variable length, which can depend on the path attribute. Some BGP updates may have less data than the maximum (for example, 64 bytes of data, 200 bytes of data, etc.). Thus, a compressed BGP update packet as discussed herein could conceivably carry several legacy BGP updates.

Consider another example in which 30 updates are to be sent, each of which has 1000 bytes of data. In this case, approximately 30,000 bytes of data need to be transferred between devices. These 30 updates may be compressed with a compression function up to a maximum limit (e.g., 4000 bytes). Here, the number of updates which need to be transmitted is greatly reduced from 30 to 1, and the number of prefixes carried is also greatly increased.

C. Embodiments of Methods

Figure 5:
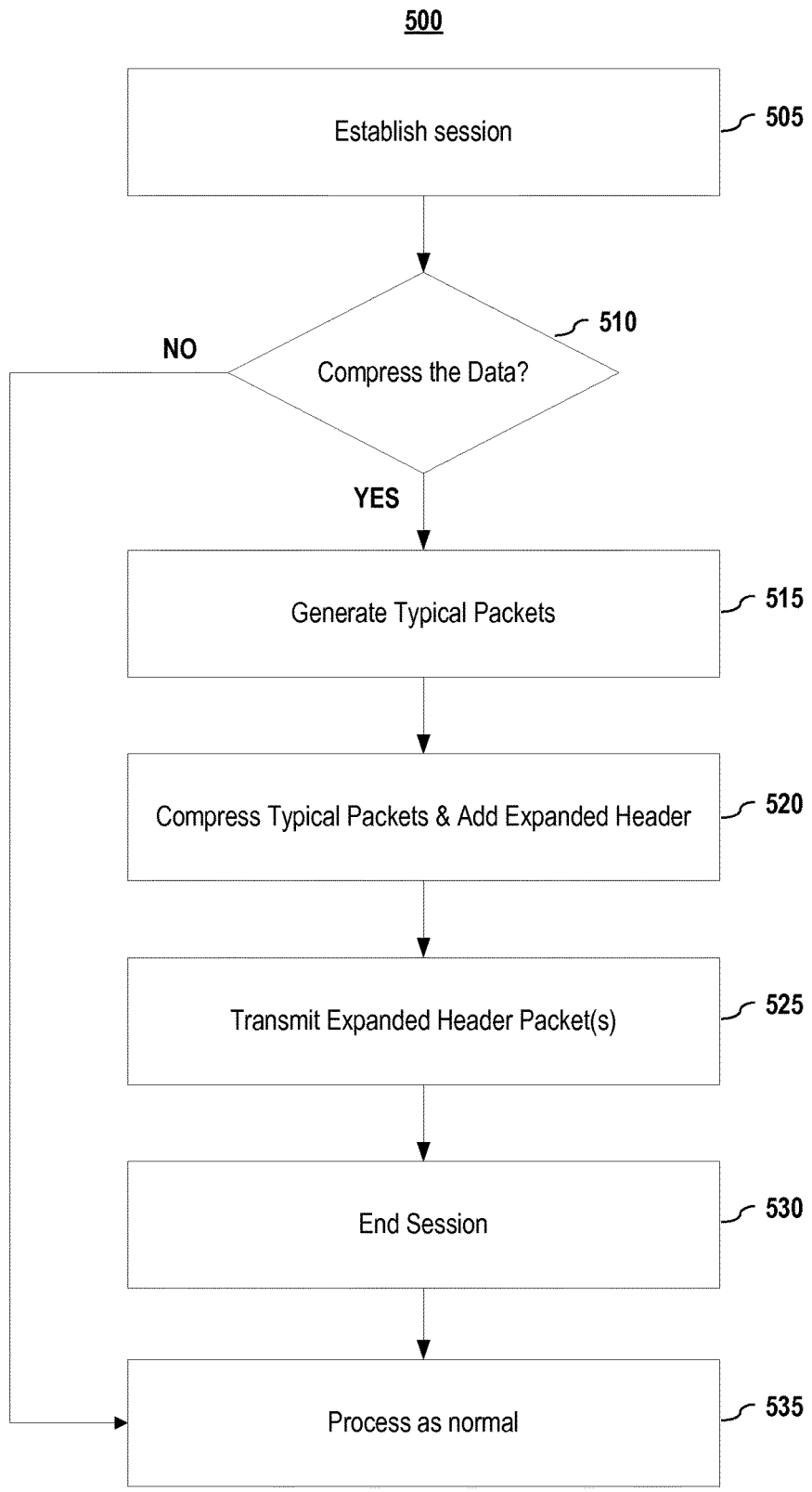
FIG. 5 depicts a method for using compression in routing information exchanges according to embodiments of the present invention.

FIG. 5 depicts a method for using compression in routing information exchanges according to embodiments of the present invention. In embodiments, compression may begin as soon as a routing information exchange session (e.g., a BGP session) moves to an ESTABLISHED state. Thus, in embodiments, two information handling devices will establish a routing information exchange session (505), such as a BGP session. In embodiments, as part of the establishment of the session (505), the device will establish whether each supports the ability to exchange compressed information.

If one of the devices does not support the ability to exchange compressed information, the devices may default to not compressing the routing information, and the information is processed as normal (535).

However, if the devices support the ability to exchange compressed information, they can proceed to exchange compressed routing information as shown in FIG. 5. It should be noted that, in embodiments, the devices may negotiate and select between a choice of compression techniques.

In embodiments, the device that is communicating the routing information may perform a check to determine (510) whether to compress the data. Because the acts of compressing and decompressing data carry processing overhead for both the sending and the receiving devices, if the amount of data is below a threshold level (which typically occurs after the initial routing information exchange), it may be more efficient to transmit the data in uncompressed format. In such cases, the data is processed (535) as normal (i.e., without compression).

However, if the amount of data to be transmitted exceeds (510) a threshold amount or, in embodiments, if the data is the initial routing information exchange, the routing information is formed (515) into normal routing information packets (e.g., normal BGP update packets). These routing packets are compressed and included (520) in the data payload section of a compressed packet that has an expanded header, such as the one depicted in FIG. 4. In embodiments, if the number of normal routing information packets exceeds what a single new compressed packet can carry, the information may be divided between a plurality of new compressed packets. In embodiments, the routing information is divided between new compressed packets in terms of whole normal routing information packets in compressed form. That is, in embodiments, the routing information of a compressed BGP update packet will be an integer multiple of normal BGP update packets.

These compressed packet(s) with the expanded headers are transmitted (525) to the receiving information handling device. This process may continue until the routing information has been communicated. In embodiments, the compressing may end (530) when the complete initial routing database is sent to the peer information handling device. In embodiments, further incremental updates may or may not be compressed.

In embodiments, an indicator may be used to indicate the end of the use of compression. In embodiments, an End-of-Routing Information Base (EOR) message from the packet sender (such as used in Graceful restart) may be used to indicate the end of the initial update process. Thus, in embodiments, an EOR may be used to signal the end of using compressed packets. In embodiments, the indication may be the receiving of a keep alive message at the receiver. Alternatively, or in addition, a timeout mechanism may be used to indicate when compression will no longer be applied. In embodiments, the timeout value may be exchanged being the devices.

D. Compression at the Sender Side

Figure 6:
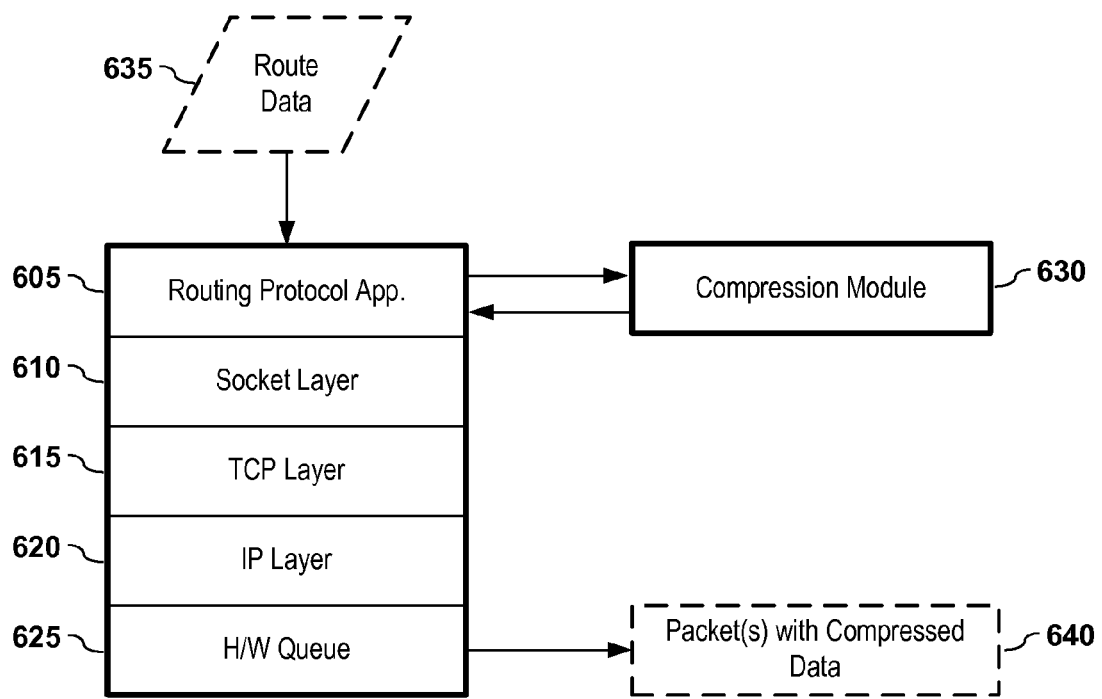
FIG. 6 depicts a data flow stack for the sending information handling system according to embodiments of the present invention.

FIG. 6 depicts a data flow stack 600 for the sending device according to embodiments of the present invention. As shown in FIG. 6, the routing data 635 is provided to the routing protocol application 605 operating on an information handling system. In embodiments, the standard packet(s) of routing information are generated by the routing protocol application layer 605. These packets may be provided to a compression module 630 that compress the packets. In embodiments, the compression module may use one or more lossless data compression algorithms so as to avoid any data loss of routing information. It should be noted that the compression module may be implemented in hardware, firmware, software, or a combination thereof.

In embodiments, compression may be offloaded to a hardware implementation, which receives the routing protocol session information and the duration for which the compression should be applied.

In embodiments, software compression implementations may be based upon existing compressing methodologies and employ software-based compression libraries such as LZ4/LZ4HC, which are available via a BSD License. One skilled in the art shall recognize that other compression methods may be employed.

In embodiments, the compressed data is returned to the routing protocol application 605 that forms the new compressed routing packets (that is packetizes the compressed packets into the payload and adds an extended header). These packets are then processed as normally done in which they are handed to the socket layer 610, to the TCP layer 615, to the IP layer 620, and then to the hardware queue for transport 640 to the peer end.

E. Decompression at the Receiver Side

Figure 7:
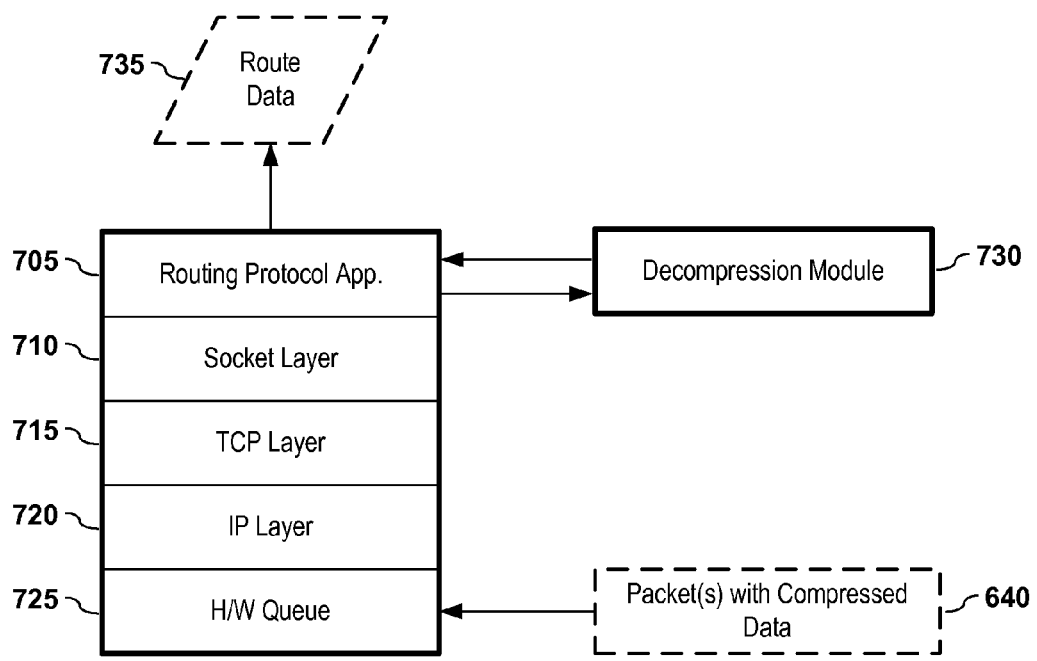
FIG. 7 depicts a data flow stack for the receiving information handling system according to embodiments of the present invention.

FIG. 7 depicts a data flow stack 700 for the receiving device according to embodiments of the present invention. As shown in FIG. 7, the packets with the compressed data 640 are received by the receiving device and move their way up the stack as typically done from the hardware queue 725, to the IP layer 720, to the TCP layer 715, and to the socket layer 710.

In embodiments, a new shim layer receives the incoming data from the socket 710 and parses the data. In embodiments, the shim layer may be part of the routing protocol application layer 705 or may be a separate layer. If the shim layer finds that the packet is marked as being of a compressed data type (e.g., new Type 5), a decompression procedure is invoked with the length taken from the header's length field. This length along with the data is given to decompression module 730. As noted above with respect to the compression module, the decompression module may be implemented in hardware, firmware, software, or a combination thereof. It should also be noted that the decompression module and the compression module may be integrated into a single compression/decompression module that performs both functions.

In embodiments, as an error check, the output data length of the decompressed packet may be compared against the uncompressed data length field value found in the extended header. These values should match; otherwise, there is an error. In the event of an error, the receiving device may request resend of that packet from the sending device. Alternatively, a BGP will, in such cases, end the session and re-establish a new session.

After decompression, a receive buffer contains multiple typical packets (e.g., packets 325-1-325-n in FIG. 3). In embodiments, these packets are parsed normally. For example, BGP update packets will be regularly processed per BGP protocol. In embodiments, the number of packets after decompression should match the total number of packets identified in the extended header field (e.g., field 315 in FIG. 3).

F. Sample Run-Time Examples

During testing, the time taken for sending around 8 BGP packets versus sending the 1 BGP packet using compression/decompress were compared. From the test, compression of 40 Kbyte of data took approximately 60 microseconds on a Linux server and decompression of the data took approximately 25 microseconds on a Linux server. The compression and decompression were performed in software.

In sample tests performed on the Linux servers, the time taken for compression/decompression was minimal or inconsequential. However, it shall be noted that the compression time may be optimized by various means—such as choosing a different compression algorithm, or using specialized hardware/field program gate arrays (FPGA) for compression and/or decompression. It shall be noted that the testing was done under particular conditions using particular configuration, which shall not be used to limit the present invention.

G. Some Advantages of Compressed

One skilled in the art shall recognize that there are several advantages to embodiments of the present invention and that the compressed packet exchange between two nodes as explained in the various embodiments will have various positive impacts on the overall system performance. Some of the advantages and positive impacts are provided below; however, one skilled in the art shall recognize that other advantages and positive impacts may exist.

One advantage is that more routing information (e.g., more BGP routes) can be packed into a single update packet with compression. As a general rule for compression ratio, the size may be reduced by 6 to 8 times lower than original size based on data randomness; this means that almost 6 to 8 times the information is conveyed. For instance, without compression X routes are transferred per packet, but with compression, this would be 6× to 8× routes per packet.

This compression provides an efficiency benefit with respect to the reduced amount of data traffic. Consider situations, such as CoPP Queue handling mechanism, in which BGP data is grouped along with OSPF/RIP/ISIS in the same CoPP Queue. CoPP queue is the hardware queue of the networking device, which helps in storing and transferring data to the CPU. Routing protocol packets are mapped to a specific queue with a defined priority. If the incoming packet rate is more than a defined value, packets will be dropped. And, TCP will trigger retransmission of these packets and will be re-sent by the sender. Since other routing protocols are also exchanging packets, which is the case during bring-up stage of the device or when a new interface comes alive, the processing of the routing packets may be delayed. It would take more time for the typical 6 to 8 packets to reach the receiving device's BGP application (in the typical uncompressed scenario) as compared to a single packet reaching the BGP application (in the compression scenarios described herein).

It should be noted that it is possible to avoid too many context switches. It is less likely that there will be a ping-pong effect between BGP/IP stack processes since the BGP application receives a fewer number of packets when using compression. Conversely, it is possible that the BGP process has more CPU time, whereas it might have to wait for more packets to arrive (in the uncompressed scenarios) either because they may be stuck in the CoPP queue or in the process of retransmission. Such delays would cause convergence to be delayed. But with compression, a fewer number of packets are being exchanged between the peers—thereby avoiding this problem.

Since more route information is communicated more efficiently, more routes are available to the BGP application, and the best-path computation will likely have fewer iterations to perform to compute a best path especially in equal cost multipath scenario. Thus, unwanted iterative processing is reduced.

Bytes on the wire—with compression, the amount of data transmitted is greatly reduced in order to communicate the same amount of information.

Buffer usage—usage of buffers is reduced by the amount of compression (e.g., by 6 to 8 times) both at the sender transmission and receiver reception path. In embodiments, only the routing protocol application (e.g., BGP application) would need a large buffer after decompression for parsing updates.

The number of TCP packets that are exchanged is also greatly reduced, which in turn reduces the number of ACK (acknowledgement) transmissions. Furthermore, since the over number of packets is reduced, the probability of a packet being dropped and needing to be retransmitted also drops. All of this helps avoid or reduce congestion.

One skilled in the art shall recognize that aspects of the present invention can be very beneficial in a variety of settings and situations. For example, core routers at Internet Service Providers (ISPs) will converge much quicker during new router bring up or upgrades. Also, any deployment scenario needs data traffic to flow at the earliest; thus, compression will quicken the exchange of BGP routes and thereby quickening the installation of routes in the Route Table Manager (RTM)/Forwarding Information Base (FIB).

H. Information Handling System Embodiments

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 8:
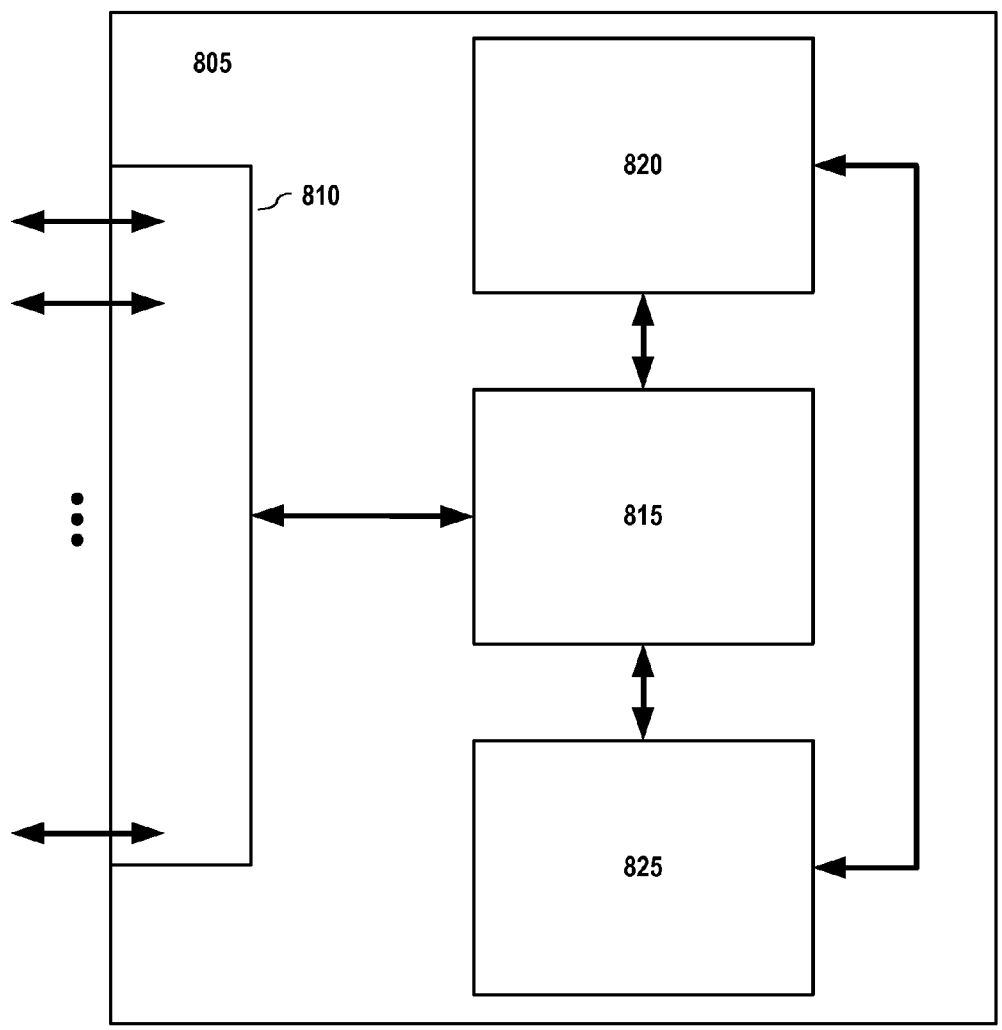
FIG. 8 shows a simplified block diagram of an information handling system according to embodiments of the present invention.

FIG. 8 depicts a simplified block diagram of an information handling system 805 according to embodiments of the present invention. It will be understood that the functionalities shown for device 805 may operate to support various embodiments of an information handling system (or node)—although it shall be understood that an information handling system may be differently configured and include different components. The information handling system 805 may include a plurality of I/O ports 810, a network processing unit (NPU) 815, one or more tables 820, and a central processing unit (CPU) 825. The system includes a power supply (not shown) and may also include other components, which are not shown for sake of simplicity.

In embodiments, the I/O ports 810 may be connected via one or more cables to one or more other network devices or clients. The network processing unit (NPU) 815 may use information included in the network data received at the node 805, as well as information stored in the tables 820, to identify a next hop for the network data, among other possible activities. In embodiments, a switching fabric then schedules the network data for propagation through the node to an egress port for transmission to the next hop.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. An information handling system for preventing traffic loss of data, the information handling system comprising:

a plurality of ports for facilitating the switching or routing of data to and/or from one or more peer information handling systems communicatively coupled to the information handling system;
one or more processors that are communicatively coupled to the plurality of ports;
a data store, communicatively coupled to the one or more processors, for storing routing information; and
a non-transitory memory comprising one or more sequences of instructions which, when executed by the one or more processors, causes steps to be performed comprising:
receiving route-related information at the information handling system;
establishing a routing information exchange session with a second information handling system;
generating a set of routing information packets;
compressing the set of routing information packets;
responsive to a total size of the set of routing information packets after being compressed exceeding a data payload size of a compressed routing information packet, dividing the set of routing information packets that have been compressed so as not to split a routing information packet that has been compressed across a two or more compressed routing information packets; and
generating a compressed routing information packet, the compressed routing information packet comprising:
a data payload comprising at least some of the routing information packets that have been compressed; and
an extended header comprising: (1) an indicator that identifies a total number of the routing information packets that have been compressed and included in the data payload, and (2) an indicator that identifies a total number of bytes of the routing information packets that have been compressed and included in the data payload before they were compressed.

2. The information handling system of claim 1 wherein the extended header further comprises:
a type data indicator that identifies the compressed routing information packet as containing compressed data in the data payload.

3. The information handling system of claim 1 wherein the route information comprises a route prefix associated with a destination.

4. The information handling system of claim 1 wherein the non-transitory memory further comprises one or more sequences of instructions which, when executed by the one or more processors, causes steps to be performed comprising:
using an end-of-compression indicator to indicate to the second information handling system that, unless indicated otherwise, a routing information packet sent to the second information handling system will not have a data payload that comprises compressed data.

5. The information handling system of claim 4 wherein the end-of-compression indicator comprises at least one of:
an End-of-RIB (EOR) message;
a first keep alive message; and
a timeout indicator.

6. The information handling system of claim 1 wherein the compression is a lossless compression.

7. The information handling system of claim 1 wherein the step of establishing a routing information exchange session with the second information handling system further comprises:
establishing with the second information handling system that it can support receiving and processing of one or more compressed routing information packets.

8. The information handling system of claim 7 wherein the step of establishing a routing information exchange session with the second information handling system further comprises:
establishing with the second information handling system the type of compression to be used on the routing information packets.

9. An information handling system for preventing traffic loss of data, the information handling system comprising:
a plurality of ports for facilitating the switching or routing of data to and/or from one or more peer information handling systems communicatively coupled to the information handling system;
one or more processors that are communicatively coupled to the plurality of ports;
a data store, communicatively coupled to the one or more processors, for storing routing information; and
a non-transitory memory comprising one or more sequences of instructions which, when executed by the one or more processors, causes steps to be performed comprising:
establishing a routing information exchange session with a second information handling system that has routing information to be shared with the information handling system; and
receiving a compressed routing information packet from the second information handling system, the compressed routing information packet comprising:
a data payload comprising a whole number of routing information packets that have been compressed; and
an extended header comprising: (1) a first indicator that identifies a total number of the routing information packets that have been compressed and included in the data payload and that the total number of the routing information packets that have been compressed and included in the data payload always represents a whole number, and (2) a second indicator that identifies a total number of bytes of the routing information packets that have been compressed and included in the data payload before they were compressed.

10. The information handling system of claim 9 wherein the extended header further comprises:
a type data indicator that identifies the compressed routing information packet as containing compressed data in the data payload.

11. The information handling system of claim 9 wherein the non-transitory memory further comprises one or more sequences of instructions which, when executed by the one or more processors, causes steps to be performed comprising:
identifying an end-of-compression indicator that, unless indicated otherwise, a routing information packet sent from the second information handling system will not have a data payload that comprises compressed data.

12. The information handling system of claim 9 wherein the non-transitory memory further comprises one or more sequences of instructions which, when executed by the one or more processors, causes steps to be performed comprising:

processing the routing information packet received from the second information handling system to obtain the routing information from the routing information packets that had been compressed.

13. The information handling system of claim 12 wherein the step of processing the routing information packet received from the second information handling system to obtain the routing information from the routing information packets that had been compressed comprises:

decompressing the data payload to obtain the routing information packets;

using the first indicator in the extended header to verify that the total number of the routing information packets obtained after decompressing matches; and processing each decompressed routing information packet as normally processed.

14. The information handling system of claim 13 wherein the step of processing the routing information packet received from the second information handling system to obtain the routing information from the routing information packets that had been compressed comprises:

using the second indicator in the extended header to verify that the total number of bytes of the routing information packets obtained after decompressing matches.

15. A method for handling route-related information at an information handling system, the method comprising:

receiving route-related information at the information handling system;

establishing a routing information exchange session with a second information handling system;

generating a set of routing information packets;

compressing the set of routing information packets;

responsive to a total size of the set of routing information packets after being compressed exceeding a data payload size of a compressed routing information packet, dividing the set of routing information packets that have been compressed so as not to split a routing information packet that has been compressed across a two or more compressed routing information packets; and generating a compressed routing information packet, the compressed routing information packet comprising:

a data payload comprising at least some of the routing information packets that have been compressed; and an extended header comprising: (1) an indicator that identifies a total number of the routing information packets that have been compressed and included in the data payload, and (2) an indicator that identifies a total number of bytes of the routing information packets that have been compressed and included in the data payload before they were compressed.

16. The method of claim 15 wherein the extended header further comprises:

a type data indicator that identifies the compressed routing information packet as containing compressed data in the data payload.

17. The method of claim 15 further comprising the step of:

using an end-of-compression indicator to indicate to the second information handling system that, unless indicated otherwise, a routing information packet sent to the second information handling system will not have a data payload that comprises compressed data.

18. The method of claim 15 wherein the compression is a lossless compression.

19. The method of claim 15 wherein the step of establishing a routing information exchange session with the second information handling system further comprises:

establishing with the second information handling system that it can support receiving and processing of one or more compressed routing information packets.

20. The method of claim 19 wherein the step of establishing a routing information exchange session with the second information handling system further comprises:

establishing with the second information handling system the type of compression to be used on the routing information packets.

\* \* \* \* \*